United States Patent

[11] 3,590,726

| | | |
|---|---|---|
| [72] | Inventor | James T. Warner<br>Richardson, Tex. |
| [21] | Appl. No. | 804,855 |
| [22] | Filed | Mar. 6, 1969 |
| [45] | Patented | July 6, 1971 |
| [73] | Assignee | Interlake Steel Corporation<br>Chicago, Ill. |

[54] COOKING-GRILL CONSTRUCTION (SKEWER ARRANGEMENT)
1 Claim, 3 Drawing Figs.

[52] U.S. Cl. ................................................. 99/339, 99/419, 126/25
[51] Int. Cl. ................................................. A47j 37/04
[50] Field of Search ................................................. 99/358, 420, 421, 442, 419—339; 17/1 S; 126/25

[56] References Cited
UNITED STATES PATENTS

| 2,577,963 | 12/1951 | Hagopian | 99/421 (HH) X |
| 2,910,930 | 11/1959 | Hankoff | 99/421 (HH) |
| 3,169,470 | 2/1965 | Oatley | 99/421 (HH) |
| 3,297,166 | 1/1967 | Summers | 99/421 (HH) |
| 3,331,308 | 7/1967 | Hoffert | 99/421 (HH) X |
| 3,442,202 | 5/1969 | Ishida | 99/421 |

*Primary Examiner*—Walter A. Scheel
*Assistant Examiner*—Arthur O. Henderson
*Attorney*—William P. Porcelli

ABSTRACT: A cooking grill of the outdoor type for use with solid or gaseous fuel having improved skewer and skewer means. The supports for the skewers are an integral part of the grill receptacle. The skewers are provided with collar means for preventing accidental displacement of the skewers when they are positioned in their supports.

PATENTED JUL 6 1971   3,590,726
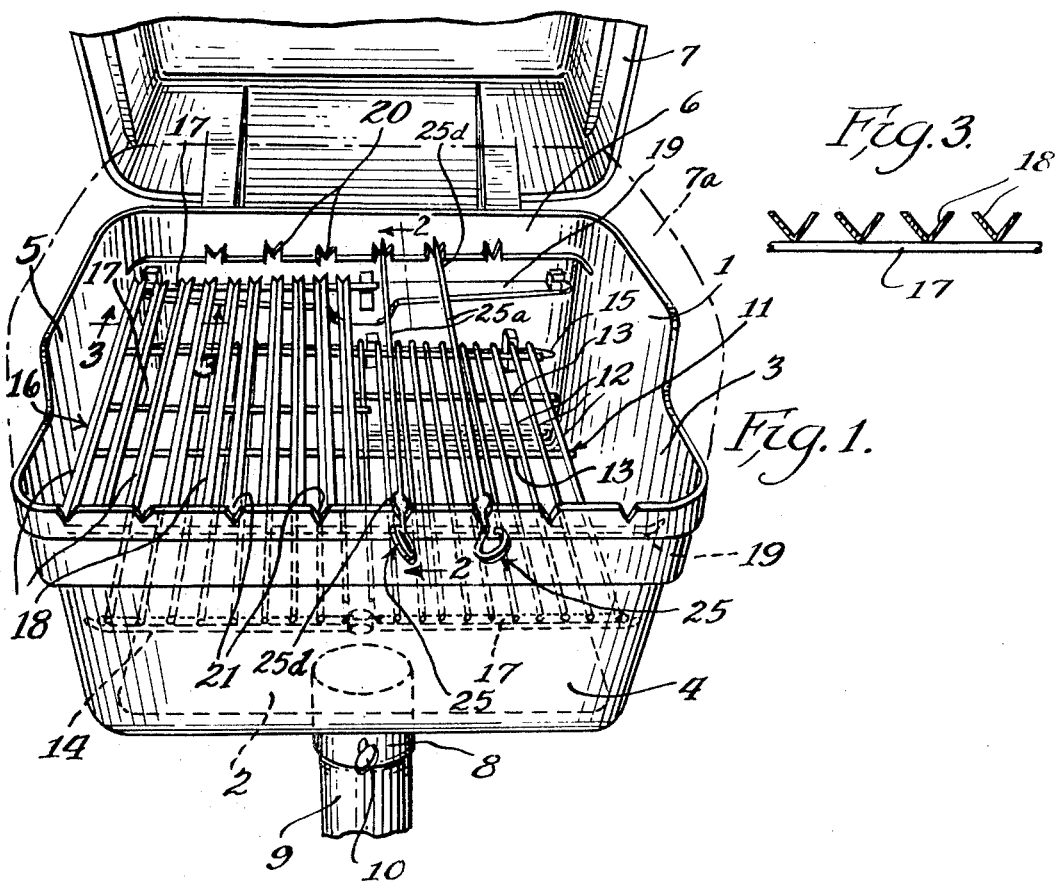
Fig.3.
Fig.1.
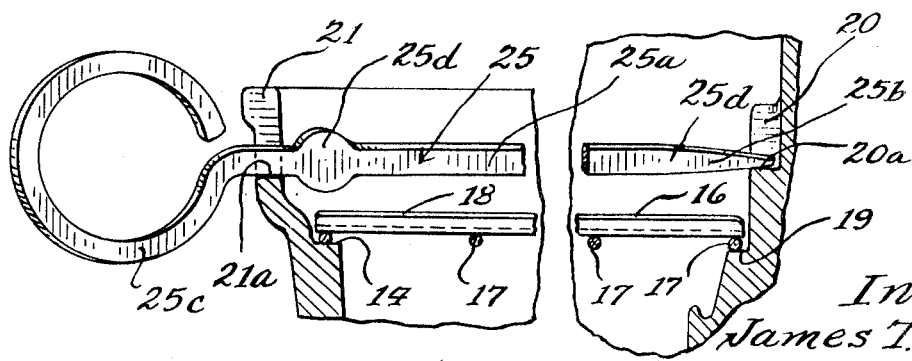
Fig.2.
Inventor
James T. Warner
By William P. Porcelli
Atty.

COOKING-GRILL CONSTRUCTION (SKEWER ARRANGEMENT)

This invention relates to the art of cooking grills and particularly to the art of improved construction of an outdoor type barbecue grill employing either charcoal or gas as the fuel. The invention can be embodied in a grill of the type shown and described in the copending application Ser. No. 804,755, filed Mar. 6, 1969, of George A. McNeff.

It is common practice to support skewers over the cooking surface of a grill of the type mentioned for the purpose of cooking shishkebab or other foods which can be held on a skewer while it is being cooked. Oftentimes, a grill has no special means for holding the skewers positioned on the grill. They are merely placed over the cooking surface with their handles extending beyond the edges of the grill in order to facilitate rotation of these skewers as necessary for insuring that the food on them is cooked evenly on all sides. There are other devices which are separate attachments for the top of a grill for handling of skewers for this type of cooking. However, they add to the cost of the unit and make it more complicated for use.

It is a principal object of this invention to provide means integral with the grill as a permanent part of it for receiving and properly locating skewers in positions where the ends of the skewers project conveniently at fixed locations to facilitate their manipulation.

It is another object of the invention to incorporate the skewer holding portions of the grill by directly casting them in the main grill housing at the time when the housing is cast as a single unit.

It is another object of the invention to provide skewer holding and locating means which is of relatively simple design and economical to produce.

It is another object of the invention to provide a skewer construction whereby each skewer has an enlarged collar portion spaced slightly from its outer end which accurately locates the skewer in position on the grill to prevent accidental displacement thereof and this facilitates manipulation of the skewer when it is rotated without being concerned that it will accidentally dislodge.

Other objects and advantages of the invention can be understood upon reference to the accompanying drawings, in which:

FIG. 1 shows a front perspective view as seen from above the grill of its portions embodying the invention described and claimed herein;

FIG. 2 shows a sectional view along the line 2–2 of FIG. 1; and

FIG. 3 shows a sectional view taken along the line 3–3 of FIG. 1.

As shown in FIG. 1, a grill embodying the invention consists of a housing 1 provided with a bottom wall 2, four substantially vertical walls 3, 4, 5 and 6 and an open top. A cover 7 is mounted in the hinge arrangement (not shown) to the wall 6 and is pivotal from the position shown in solid outline in FIG. 1 to a closed position indicated by phantom outline at 7a. The housing 1 is provided with a collar 8 extending downwardly from its bottom wall 2 and telescoped over a supporting post 9. The housing is held in position by a screw 10 passing through the collar 8 and bearing against the post 9. Internally of the housing 1 is provided a grate 11 consisting of a plurality of rods 12 extending parallel to each other and spaced from each other and secured to other rods 13 spaced from each other and extend perpendicular to the rods 12. The grate 11 is held on ledges 14 and 15 positioned above the level of the bottom wall 2 of the housing 1. The grate 11 supports the solid fuel, such as charcoal, if the grill employs solid fuel; otherwise, the grate 11 may support lava briquets, or the like, which are heated to incandescence by gas supplied through the post 9 if the grill is to be heated by the use of gas as fuel.

Above the level of the grate 11 is the cooking grate 16 which is composed of spaced parallel rods 17 extending perpendicular to and secured to channel-shaped troughs 18 of V-shaped cross section as indicated in FIG. 3. This cooking grate 16 is supported on ledges 19 at both the front and rear walls 4 and 6 of the housing 1. The positions of the ledges 19 are such that the cooking grate 16 slopes slightly downward to the rear of the grill to permit the gravity of fat dripping into the troughs 18.

As indicated in FIG. 1, the cooking grate 16 covers one-half of the cooking area of the grill. Although not shown, another such grate 16 is provided to cover the other half of the cooking area. Otherwise a single cooking grate can be made large enough to cover the entire cooking area.

A typical skewer 25 consists of a single length of wire rod bent in the shape shown in both FIGS. 1 and 2. It is provided with a long straight length 25a which terminates in a relatively sharp point at its far end 25b. Its inner end 25c is bent into a circle to provide a handle for manipulation of the skewer. Adjacent to, but spaced from, the handle 25c is a wider collar portion 25d.

The housing 1, in order to accommodate the skewers 25, is provided with V-shaped notches 20 cast directly into the backwall 6 of the housing 1. These notches are provided with ledges 20a on which the outer ends 25b of the skewers 25 can rest. At the upper edge of the front wall 4 of the housing 1 are provided other notches 21 which have ledges 21a for supporting the handled ends of the skewers 25. The spacing of the notches 21 from each other is the same as the spacing of the notches 20 so that there is a corresponding notch 21 opposite a notch 20. This permits the skewers to be positioned on the grill in spaced parallel relation.

By having the enlarged collar portion 25d on each skewer 25, the walls surrounding the notch 21 confined the skewer between the collar portion 25d and the enlarged handle 25c. This keeps the skewer 25 in place to prevent the pointed end 25b from falling off from a ledge 20a. With this construction, the chef can rotate the skewers by manipulating the handle portions 25c without being concerned over the possibility of the skewers 25 falling from the notches 20. Furthermore, with the arrangement as shown, the skewer handles 25c are at the forward end of the grill where they can be manipulated by the chef who ordinarily would be positioned in front of it.

Although only substantially a single embodiment of the invention has been shown and described, it should be clearly understood that the invention can be made in many different ways without departing from the true scope of the invention as defined by the appended claims in which:

1. A cooking grill, comprising, an open top receptacle, a cooking grate supported in the receptacle above the level of the bottom of the receptacle, means for heating the cooking grate and food placed thereon, the receptacle being provided with a bottom wall and four sidewalls consisting of a rear wall, a front wall and two end walls to form a well shape in the receptacle, both the rear and front walls to form a well shape in the receptacle, both the rear and front walls being provided with skewer supports above the level of the cooking grate to support skewers of a type having enlarged handle ends for facilitating manual gripping and manipulation thereof and slender body portions with a sharpened forward end to facilitate impaling of food and retaining it thereon, said skewer supports being aligned to support the skewers approximately horizontally above the cooking grate level, the supports in the rear wall being recesses for supporting the outer ends of the skewers and the supports in the front wall being recesses for supporting the skewers adjacent their opposite handle ends, each skewer having an enlarged collar portion spaced slightly from its handle end to act as a restraint for axial movement of the skewer when it is positioned in its supports, thereby preventing accidental displacement of the skewer from its position on its supports while manipulating the skewer when food impaled thereon is being cooked on the grill, said cooking grill having a plurality of spaced channel-shaped troughs which are positioned to receive melted fat from food cooking on the skewers, said troughs sloping downwardly toward one sidewall of the receptacle so that the melted fat caught in the troughs travels toward said sidewall by force of gravity, said sidewall being provided with grooved means for receiving the melted fat from the troughs, the groove means being aligned for directing the melted fat to a confined path region down the sidewall to the back of the receptacle, said bottom being provided with a drain and being sloped so that melted fat reaching the bottom wall pours by gravity toward the drain.